United States Patent
Borean et al.

(10) Patent No.: US 10,935,997 B2
(45) Date of Patent: Mar. 2, 2021

(54) CONTROL OF A HEATING/COOLING SYSTEM

(71) Applicant: TELECOM ITALIA S.p.A., Milan (IT)

(72) Inventors: Claudio Borean, Turin (IT); Giuseppe Di Bella, Turin (IT); Ennio Grasso, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 138 days.

(21) Appl. No.: 16/065,198

(22) PCT Filed: Dec. 31, 2015

(86) PCT No.: PCT/EP2015/081465
§ 371 (c)(1),
(2) Date: Jun. 22, 2018

(87) PCT Pub. No.: WO2017/114582
PCT Pub. Date: Jul. 6, 2017

(65) Prior Publication Data
US 2019/0004550 A1   Jan. 3, 2019

(51) Int. Cl.
*G05B 15/02* (2006.01)
*F24F 120/10* (2018.01)
*G05D 23/19* (2006.01)
*F24F 11/67* (2018.01)
(Continued)

(52) U.S. Cl.
CPC .......... *G05D 23/1904* (2013.01); *F24F 11/30* (2018.01); *F24F 11/67* (2018.01);
(Continued)

(58) Field of Classification Search
None
See application file for complete search history.

(56) References Cited

U.S. PATENT DOCUMENTS 10,001,792 B1 * 6/2018 Packer ............... F24F 11/62
2010/0235004 A1 * 9/2010 Thind ................. G05B 15/02
700/277
(Continued)

OTHER PUBLICATIONS

Castanedo, Federico & López-de-Ipiña, Diego & Aghajan, Hamid & Kleihorst, Richard. (2011). Building an occupancy model from sensor networks in office environments. 2011. 1-6. 10.1109/ICDSC.2011.6042929. (Year: 2011).*

(Continued)

*Primary Examiner* — Kenneth M Lo
*Assistant Examiner* — Istiaque Ahmed
(74) *Attorney, Agent, or Firm* — Oblon, McClelland, Maier & Neustadt, L.L.P.

(57) ABSTRACT

A method for controlling a heating/cooling system located at a home of a user. For a population of users, occurrences of occupancy-related events occurring in the users' homes are detected. Then, occurrences of such occupancy-related events in different timeslots are counted separately for each user of the population. The counts of the various users are then merged and a topic model is applied thereto, to provide probabilities that latent habits give raise to certain sequences of occupancy-related events and proportions of each habit in the home occupancy routine of each user of the population. Thereby, a reliable forecast of the home occupancy routine of each user of the population may be provided. That allows setting the heating/cooling system of each user of the population to fit such reliable forecast, minimizing energy waste and/or maximizing user's comfort.

13 Claims, 4 Drawing Sheets

(51) Int. Cl.
*G06Q 10/04* (2012.01)
*F24F 11/30* (2018.01)
*F24F 120/14* (2018.01)

(52) U.S. Cl.
CPC ............. *G05B 15/02* (2013.01); *G06Q 10/04* (2013.01); *F24F 2120/10* (2018.01); *F24F 2120/14* (2018.01)

(56) References Cited

U.S. PATENT DOCUMENTS

| | | | |
|---|---|---|---|
| 2012/0066168 A1* | 3/2012 | Fadell | G05B 15/02 706/52 |
| 2013/0297555 A1 | 11/2013 | Fadell et al. | |
| 2015/0006463 A1 | 1/2015 | Fadell et al. | |
| 2015/0177716 A1* | 6/2015 | Hyman | H05B 37/0227 700/275 |
| 2016/0100233 A1 | 4/2016 | Fadell et al. | |

OTHER PUBLICATIONS

P. Liu, S. Nguang and A. Partridge, "Occupancy Inference Using Pyroelectric Infrared Sensors Through Hidden Markov Models,", Oct. 29, 2015, retrieved from the Internet <https://ieeexplore.ieee.org/document/7312399> (Year: 2015).*

M. Gupta, et al., "Adding GPS-control to traditional thermostats: an exploration of potential energy savings and design challenges," International Conference on Pervasive Computing, 2009, pp. 1-18.

S. Tominaga, et al., "A Unified Framework for Modeling and Predicting Going-Out Behavior," Pervasive Computing. Pervasive 2012, Lecture Notes in Computer Science, vol. 7319, 18 pages.

F. Castanedo, et al., "Building an occupancy model from sensor networks in office environments," 2011 Fifth ACM/IEEE International Conference on Distributed Smart Cameras, XP055285360, Aug. 1, 2011, 7 pages.

F. Castanedo, et al., "Learning routines over long-term sensor data using topic models," Expert Systems, vol. 31, No. 4, XP055285342, May 29, 2013, pp. 365-377.

L. Candanedo, et al., "Accurate occupancy detection of an office room from light, temperature, humidity and $CO_2$ measurements using statistical learning models," Energy and Buildings, vol. 112, XP029422029, Dec. 2, 2015, pp. 28-39.

International Search Report dated Jul. 14, 2016 in PCT/EP2015/081465 filed Dec. 31, 2015.

* cited by examiner

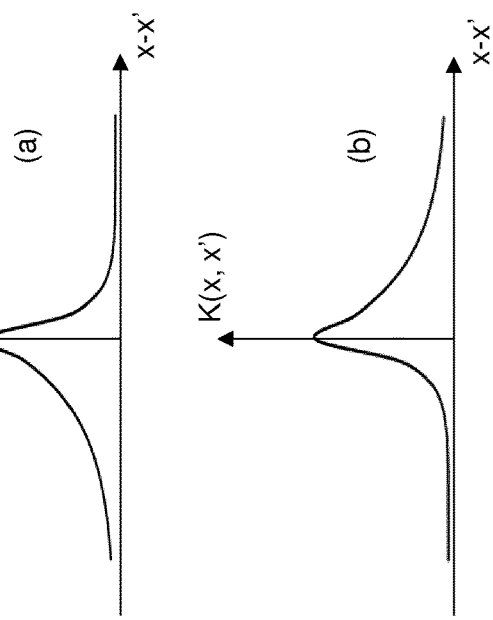
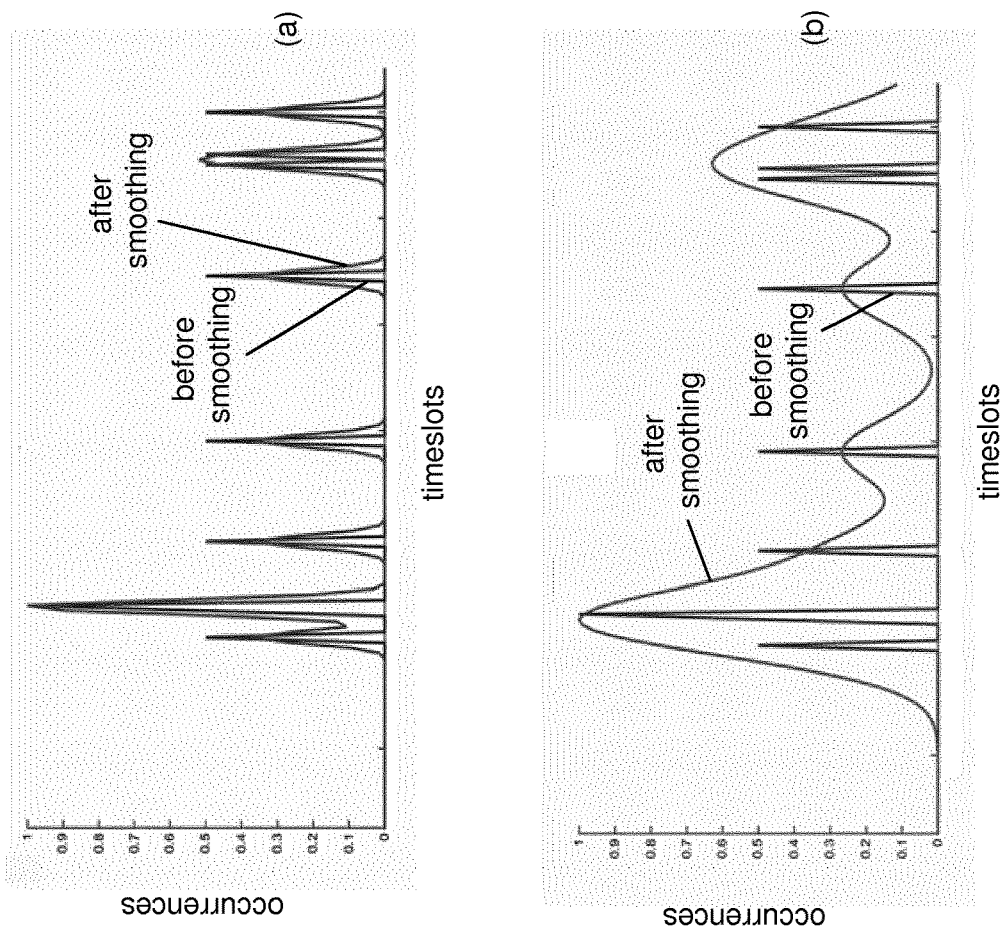
Figure 5
Figure 4

CONTROL OF A HEATING/COOLING SYSTEM

TECHNICAL FIELD

The present invention relates to the field of domestic appliances. In particular, the present invention relates to a method for controlling a heating/cooling system in a domestic environment. The method also relates to a system and to a computer program product suitable for implementing such method.

BACKGROUND ART

As known, heating/cooling systems may be either autonomous or centralized.

In an autonomous system, a thermostat located in the domestic environment typically measures the domestic temperature and automatically controls the heating/cooling system based on the measured temperature. The thermostat may be manually set by the user, typically based on his home occupancy habits.

Conversely, a centralized system (e.g. in a block of flats) is centrally set independently of the actual home occupancy habits of the single users. This may give raise to energy wastes, since flats may be needlessly heated or cooled when not occupied. Besides, uncomfortable situations may arise, wherein flats are insufficiently heated or cooled while they are occupied.

Nowadays centralized heating systems allow users regulating the temperature of each room in their flats. To this purpose, each radiator of the system is typically provided with a thermostatic valve regulating the flow of hot/cold water and/or of an electric current into the radiator. The thermostatic valve may be manually set by the user, e.g. based on his occupancy habits for that room.

Though thermostats controlling autonomous heating/cooling systems and thermostatic valves individually controlling radiators in centralized heating systems allow reducing energy wastes, a significant amount of energy is still wasted by heating and cooling unoccupied domestic environments, because people have difficulties in manually setting their thermostats or thermostatic valves in an optimal way and in timely modifying those settings when a change in their home occupancy habits arise.

M. Gupta et al. "Adding GPS-control to traditional thermostats: an exploration of potential energy savings and design challenges" (2009) describes a just-in-time heating and cooling based on travel-to-home distance obtained from location-aware mobile phones, which allows improving the energy saving. GPS travel data from 8 participants (8-12 weeks each) were analysed.

S. Tominga et al. "A unified framework for modelling and predicting going-out behaviour" (2012) discloses a non-parametric clustering method to extract one's rhythm of the daily going-out behaviour and a prediction method of one's future presence using the extraction method.

SUMMARY OF THE INVENTION

The Applicant has noticed that these known methods have some drawbacks.

As to the method of M. Gupta et al., it requires constantly tracking the position of each user via GPS sensors. Hence, for benefitting of this just-in-time heating and cooling method, the user shall constantly have with him a switched-on GPS sensor. This is inconvenient and invasive for a user.

Moreover, while tracking the user's position with GPS sensors may allow determining in advance when the user is going back home, it does not allow determining in advance when the user is leaving home. Moreover, the finest movements of a user within his home (e.g. leaving a room) can not be detected by GPS sensors. Hence, a per-room regulation of the heating/cooling system is not possible.

In principle, at least some of the above drawbacks could be solved by a method that—instead of constantly tracking the movements of a user—is capable of predicting the user's behaviour based on a set of sample data, e.g. as the method of Tominga et. al.

This known method however exhibits other drawbacks. According to this known method, indeed, each user is considered separately, namely the travel-to-home habits of each single user are separately considered for a number of weeks. The data collected for each single user are however typically very sparse, and are therefore insufficient to provide enough statistical significance. Hence, with such sparse data, simple statistical averages may lead to erroneous predictions on the user's home occupancy habits, because of the high variance in such few data. Moreover, the method is not capable of predicting the home occupancy habits for new users, because data for new users are inherently unavailable.

In view of the above, the Applicant has tackled the problem of providing a method for controlling a heating/cooling system in a domestic environment, which overcomes the aforesaid drawback.

In particular, the Applicant has tackled the problem of providing a method for controlling a heating/cooling system in a domestic environment, which is capable of automatically and reliably predicting the home occupancy habits of the user, so that the heating/cooling system may be operated to fit more precisely the actual home occupancy habits of the user, thereby allowing to minimize energy wastes and/or to maximize the user's comfort.

According to embodiments of the present invention, this problem is solved by a method for controlling a heating/cooling system in a domestic environment which makes use of a modelling algorithm or model adapted to provide a forecast of a domestic environment occupancy routine of the user/users.

For example, a modelling algorithm adapted to provide a forecast of a domestic environment occupancy routine of the user/users can be a topic modelling algorithm. As known, topic modelling algorithms analyse a set of documents (also termed "corpus") in order to discover the topics that occur in the documents of the corpus as emerging from the words contained therein. In particular, according to Bayesian topic models (such as LDA, Latent Dirichlet Allocation), all the documents in the corpus share a same set of topics, but each document exhibits the topics in different proportions. Starting from the proportion $p(w|d)$ of occurrences of each word w in each document d of the corpus, LDA allows determining both the probability $p(w|t)$ that a certain topic t generates a word w and the proportion $p(t|d)$ of each topic t in each document d of the corpus.

The inventors have realized that a Bayesian topic model such as LDA may be applied to the home occupancy habits of a population of users. In particular, since human routines typically follow a weekly cycle, the home occupancy weekly routine of a user may be seen as a document, and the home occupancy weekly routines of a population of users may be seen as a corpus of documents. The week is divided into a number of timeslots having a same duration (e.g. half an hour), and occupancy-related events such as entering home (or a room) or exiting home (or a room) occurring in the various timeslots are the "words" of which the home occupancy weekly routines of the users are made. Therefore, the "dictionary" of the possible words in this context are the occupancy-related events occurring in all the timeslots of a week.

The inventors have realized that the occupancy-related events in the various timeslots (words) are indicative of certain habits (topics), which may be present in the home occupancy weekly routines of all the users of the population. In particular, all the users of the population share a same set of habits (topics), but the home occupancy weekly routine of each user of the population (document) exhibits the habits (topics) in different proportions (some habits may be totally absent in the home occupancy weekly routing of a given user). According to the present invention, starting from the proportions (which basically are normalized counts) of occurrences p(w|d) of occupancy-related events in the various timeslots (words) in the home occupancy weekly routines (document) of all the users of the population (corpus), both the probability p(w|t) that a certain habit (topic) generates an occupancy-related event in a timeslot (word) and a proportion p(t|d) of each habit in the home occupancy weekly routine of each user of the population are determined. This allows providing a forecast of the home occupancy weekly routine of each single user, based on which suitable settings of his heating/cooling system are generated.

The combined use of data indicative of the home occupancy habits of several users advantageously enhances the capability of the method to reliably predict the home occupancy habits of every single user, even if the data for each single user are sparse. The heating/cooling system of each user may be accordingly set so as to fit more precisely the actual home occupancy habits of each user of the population (and also of new users), thereby allowing to minimize energy wastes and/or to maximize the users comfort.

According to a first aspect, the present invention provides a method for controlling a heating/cooling system located in a domestic environment of a user, the method comprising:
a) for each user of a number M of users, detecting occurrences of an occupancy-related event carried out by each user in its respective domestic environment, the occupancy-related event being indicative of a change of status of the domestic environment between an occupied status and a non-occupied status;
b) for each user, providing respective counts of occurrences of the occupancy-related event in a plurality of timeslots;
c) merging the respective counts of occurrences of the occupancy-related event in the plurality of timeslots relating to the number M of users and applying a model thereto, so as to provide a forecast of a domestic environment occupancy routine of a specific user; and
d) based on the forecast of the domestic environment occupancy routine of that user, determining a setting of the heating/cooling system located in the domestic environment of that user.

Preferably, at step a) detecting comprises receiving information from at least one presence sensor located in the respective domestic environment of each user and processing this information to determine whether the occupancy-related event occurred, the occupancy-related event comprising one of "the user entered the respective domestic environment" or "the user exited the respective domestic environment".

Preferably, at step b) providing respective counts for each user comprises dividing a week into the plurality of timeslots having a same duration T and, during a number N of observation weeks, counting for each timeslot a respective number of the occurrences of the occupancy-related event in the each timeslot.

According to an embodiment, at step b) the number of occurrences of the occupancy-related event in the each timeslot counted during the N observation weeks are weighted.

According to a variant, at step b) each occurrence of the number of occurrences of the occupancy-related event in the each timeslot counted during the N observation weeks is multiplied by a respective weight $\alpha^n$, where $\alpha$ is comprised in the range (0.9, 0.99) and n is an observation week index ranging from 1 to N.

Preferably, step b) also comprises normalizing the counts of occurrences of the occupancy-related event in the plurality of timeslots, thereby providing proportions of occurrences of the occupancy-related event in the plurality of timeslots in a domestic environment occupancy routine of each user.

Preferably, at step b) smoothed proportions of occurrences of the occupancy-related event in the plurality of timeslots are calculated for each user by applying a smoothing kernel to the proportions of occurrences of the occupancy-related event in the plurality of timeslots, the smoothing kernel distributing a proportion of occurrences of the occupancy-related event in a certain timeslot over at least one timeslot preceding the certain timeslot and over at least one timeslot following the certain timeslot.

According to a variant, at step b) the smoothing kernel is such to distribute the proportion of occurrences of the occupancy-related event in the certain timeslot mainly over the at least one timeslot preceding the certain timeslot, or mainly over the at least one timeslot following the certain timeslot.

Preferably, at step c) merging comprises merging the smoothed proportions of occurrences of the occupancy-related event in the plurality of timeslots calculated for the number M of users in a matrix, each column of the matrix comprising the smoothed proportions of occurrences of the occupancy-related event in the plurality of timeslots calculated for a user.

Preferably, at step c) applying the model comprises processing the matrix to determine:
(i) a first matrix, each column of the first matrix comprising probabilities that a certain habit generates a certain time sequence of occupancy-related events in the plurality of timeslots; and
(ii) a second matrix, each column of the second matrix indicating proportions of a plurality of habits in the domestic environment occupancy routine of a user.

Preferably, at step c) the forecast of the domestic environment occupancy routine of the user is calculated as an internal product between the first matrix and the second matrix, the internal product resulting in a forecast matrix, a column of the forecast matrix comprising probabilities that the occupancy-related event occurs in the plurality of timeslots for a user.

Preferably, step c) comprises providing the forecast of the domestic environment occupancy routine of the user in terms of times at which the occupancy-related event will most probably occur, these times corresponding to timeslots of the plurality of timeslots having higher probability values in the correspond column of the forecast matrix.

According to a variant, at step d) determining the setting of the heating/cooling system comprises determining at least one switch-on time and/or at least one switch-off time of the heating/cooling system based on the times at which the occupancy-related event will most probably occur according to the forecast of the domestic environment occupancy routine of the user.

Preferably, step d) also comprises providing at least one control signal suitable for operating the heating/cooling system according to the determined setting.

Preferably, steps b), c) and d) are periodically iterated.

According to a second aspect, the present invention provides a device for controlling a heating/cooling system located in a domestic environment of a user, the device being configured to:
a) for each user of a number M of users, detect occurrences of an occupancy-related event carried out by each user in its respective domestic environment, the occupancy-related event being indicative of a change of status of the domestic environment between an occupied status and a non-occupied status;
b) for each user, provide respective counts of occurrences of the occupancy-related event in a plurality of timeslots;
c) merge the respective counts of occurrences of the occupancy-related event in the plurality of timeslots relating to the number M of users and apply a model thereto, so as to provide a forecast of a domestic environment occupancy routine of a determined user; and
d) based on the forecast of the domestic environment occupancy routine of that user, determine a setting of the heating/cooling system located in the domestic environment of the user.

According to a third aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein:

FIG. 4 shows an exemplary histogram smoothed using a smoothing kernel with a narrower and a larger bandwidth; and FIG. 5 show two exemplary asymmetric smoothing kernels.

DETAILED DESCRIPTION OF PREFERRED EMBODIMENTS OF THE INVENTION

Figure 1:
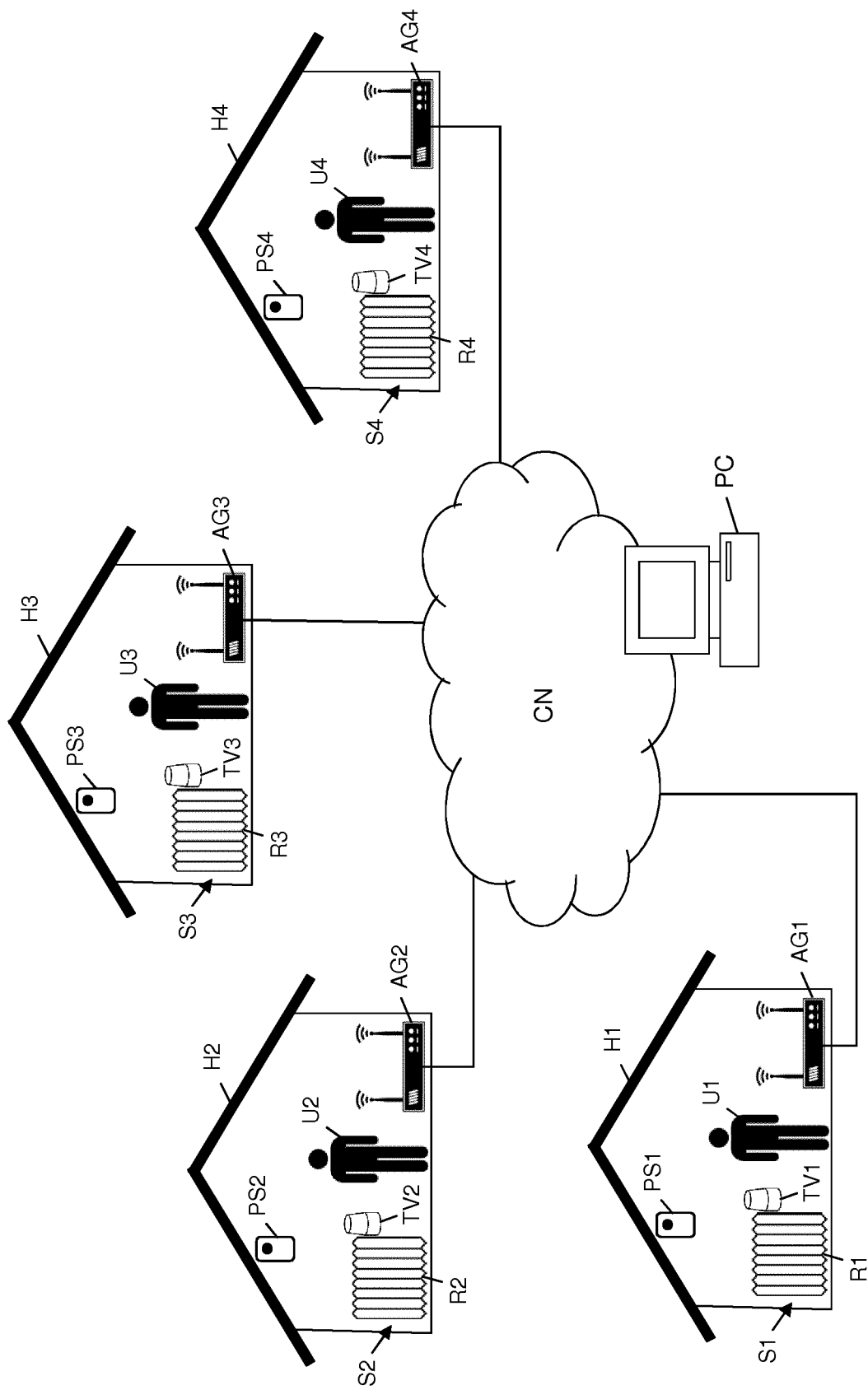
FIG. 1 schematically shows an exemplary scenario wherein the method according to embodiments of the invention is implemented.

FIG. 1 schematically shows an exemplary scenario wherein the method for controlling a heating/cooling system according to embodiments of the present invention is implemented.

FIG. 1 in particular shows a number M (M=4, by way of non limiting example) of homes H1, H2, H3, H4 pertaining to respective users U1 U2, U3, U4. Though in FIG. 1 the homes H1, H2, H3, H4 are represented as separate buildings, this is not limiting. The method according to embodiments of the present invention is indeed applicable also to a group of flats in a same building. The number M of considered users is preferably higher than 10, more preferably higher than 30, even more preferably higher than 100. The higher M, the most accurate the forecast of the home occupancy habit of each single user, as it will be described in detail herein after.

Each home H1, H2, H3, H4 is provided with a respective heating/cooling system S1, S2, S3, S4. The heating/cooling systems may be either centralized systems or autonomous systems. Each heating/cooling system S1, S2, S3, S4 preferably comprises at least one heating/cooling unit capable of modifying (increasing and/or decreasing) the temperature of the surrounding environment, and at least one control unit suitable to control the at least one heating/cooling unit. In general, a heating/cooling system comprises several heating/cooling units, typically one per each room of the home. Further, a heating/cooling system may comprise either a control unit per each heating/cooling unit (a thermostatic valve controlling the flow of hot water in a single radiator), or a single control device capable of controlling all the heating/cooling units in the home (e.g. a thermostat controlling the boiler which provides hot water to all the radiators in the home). Herein after, by way of non limiting example, it is assumed for simplicity that each heating/cooling system comprises a single heating/cooling unit and a single control unit.

The heating/cooling units may be for instance radiators (as schematically depicted in FIG. 1, where they are indicated as R1, R2, R3, R4), underfloor heating elements (electric or hydronic), heat pumps, chillers, etc. Besides, the control units may be for instance thermostatic valves (as schematically depicted in FIG. 1, where they are indicated as TV1, TV2, TV3, TV4) which control the flow of hot water in the radiators R1, R2, R3, R4, respectively. Alternatively, the control devices may be e.g. thermostats suitable for switching on/off the boilers providing hot water to the radiators R1, R2, R3, R4.

Further, each home H1, H2, H3, H4 is preferably provided with a presence sensor PS1, PS2, PS3, PS4 capable of detecting occupancy-related events, namely events indicative of changes in the occupancy status (occupied/not occupied) of the home H1, H2, H3, H4. Such occupancy-related events preferably are entering home H1, H2, H3, H4 and exiting home H1, H2, H3, H4.

In addition, each home H1, H2, H3, H4 may be provided with further presence sensors (not shown in the drawing) capable of detecting occupancy-related events indicative of changes in the occupancy status of at least one specific room of the home (e.g. the kitchen, the bedroom, etc.). Herein after however, for simplicity, such further presence sensors will not be considered.

The presence sensors PS1, PS2, PS3, PS4 may be any kind of sensor capable of providing information from which an occupancy-related event may be directly or indirectly inferred. For instance, the presence sensors PS1, PS2, PS3, PS4 may be motion detectors such as PIR (Passive InfraRed) sensors, which are typically used in surveillance systems. Alternatively, the presence sensors PS1, PS2, PS3, PS4 may be $CO_2$ sensors which measure the level of $CO_2$ in the surrounding environment (the user entering home may be indirectly inferred from an increased level of $CO_2$, whereas the user exiting home may be indirectly inferred from a decreased level of $CO_2$). Alternatively, the presence sensors PS1, PS2, PS3, PS4 may be electricity meters which measure the electricity consumption in the home (the user entering home may be indirectly inferred from an increased energy consumption, whereas the user exiting home may be indirectly inferred from a decreased energy consumption).

Further, each home H1, H2, H3, H4 is preferably provided with a respective access gateway AG1, AG2, AG3, AG4. All the access gateways AG1, AG2, AG3, AG4 are preferably connected to a same communication network CN (e.g. an IP network) via respective broadband links (e.g. ADSL links or optical fiber links). Each access gateway AG1, AG2, AG3, AG4 preferably provides connectivity with the communication network CN to user devices located in the respective home H1, H2, H3, H4, including the presence sensor PS1, PS2, PS3, PS4 and—optionally—also the thermostatic valve TV1, TV2, TV3, TV4. Still particularly, each presence sensor PS1, PS2, PS3, PS4 is preferably configured to send the sensed occupancy-related data to the communication network CN via the respective access gateways AG1, AG2, AG3, AG4. Optionally, each thermostatic valve TV1, TV2, TV3, TV4 is also preferably configured to receive control signals from the communication network CN via the respective access gateways AG1, AG2, AG3, AG4 and to automatically change its setting accordingly.

Preferably, the access gateways AG1, AG2, AG3, AG4 are wireless access gateways providing wireless connectivity with the communication network CN to presence sensors PS1, PS2, PS3, PS4 and, optionally, to thermostatic valves TV1, TV2, TV3, TV4.

Preferably, the communication network CN comprises at least one computer PC executing an algorithm receiving as input the occupancy-related data from the presence sensors PS1, PS2, PS3, PS4 and processing them to provide as output a suitable setting for at least one of the thermostatic valves TV1, TV2, TV3, TV4 by applying a model, e.g., a topic model. The computer PC may be either a single computer or a cluster of computers implementing a cloud computing technique.

The algorithm executed by the computer PC will be described in detail herein after with reference to the flow chart of FIG. 2.

As the computer PC receives occupancy-related data from each presence sensor $PS_i$ (i=1, 2 . . . M) (step 200), it preferably discretizes them (step 201). As discussed above, the occupancy-related data are information that allow directly or indirectly inferring occupancy-related events (namely, the user entering home and the user exiting home), and depend on the type of presence sensor (for instance motion sensor, $CO_2$ sensor, electricity meter, etc.). Preferably, the discretizing step 201 comprises translating the occupancy-related data received from each presence sensor $PS_i$ (i=1, 2, . . . M) into "words" of the home occupancy weekly routine of the user $U_i$ (i=1, 2 . . . M), which is seen as a "document".

To this purpose, the week is divided into a number of timeslots having the same duration T. The duration T is preferably short enough to capture different home occupancy habits of the users, but long enough to account for noise and allow a statistical sharing of features. For instance, T may be equal to 30 minutes, meaning that the week is divided into 336 timeslots. This way, a vocabulary of 336 "words" is provided, each word being an occupancy-related event (entering home or exiting home) occurring during that timeslot.

Then, for each user $U_i$, based on the occupancy-related data received from the presence sensor $PS_i$, it is preferably determined whether the user $U_i$ entered home $H_i$ or exited home $H_i$ during each timeslot and, in the affirmative, an occurrence of the corresponding "word" is counted.

The occupancy-related data relating to the user $U_i$ are preferably substantially continuously received from the presence sensor $PS_i$ for a number N of observation weeks (e.g. N=3 to 5). During these observation weeks, the count of occurrences of each "word" may increase from 0 (if the user $U_i$ entered or exited home $H_i$ during the corresponding timeslot at none of the N observation weeks) to a maximum value (if the user $U_i$ entered or exited home $H_i$ during the corresponding timeslot at all the N observation weeks).

If the occurrences of a "word" in the various observation weeks are plainly summed up, the maximum value that the count of occurrences of a "word" may reach after N observation weeks is N. According to preferred variants, however, the occurrences of a same "word" in different observation weeks are preferably weighted before being summed up, so as to give more importance to more recent events. According to a particularly preferred variant, an exponential average is applied to the occurrences of a "word", by defining a factor α comprised in the range (0, 1), more preferably in the range (0.9, 0.99) (e.g. α=0.9), and by applying a weight $α^n$ to the occurrence of a "word" during the observation week $n^{th}$ (n=1, 2, . . . N). For instance, in case N=4, the weights applied to the occurrences of a same word (e.g. the user $U_i$ exiting home $H_i$ between 08:00 and 08:30 of Monday) during four weeks are 0.6561 for the first week, 0.729 for the second week, 0.8100 for the third week and 0.900 for the fourth week. The counts of occurrences of the various "words" are then normalized over the number N of observation weeks, namely they are divided by N. This way, the proportion of occurrences p(w|d) of each "word" in the home occupancy weekly routine of each user $U_i$ (document) is advantageously provided.

Figure 3:
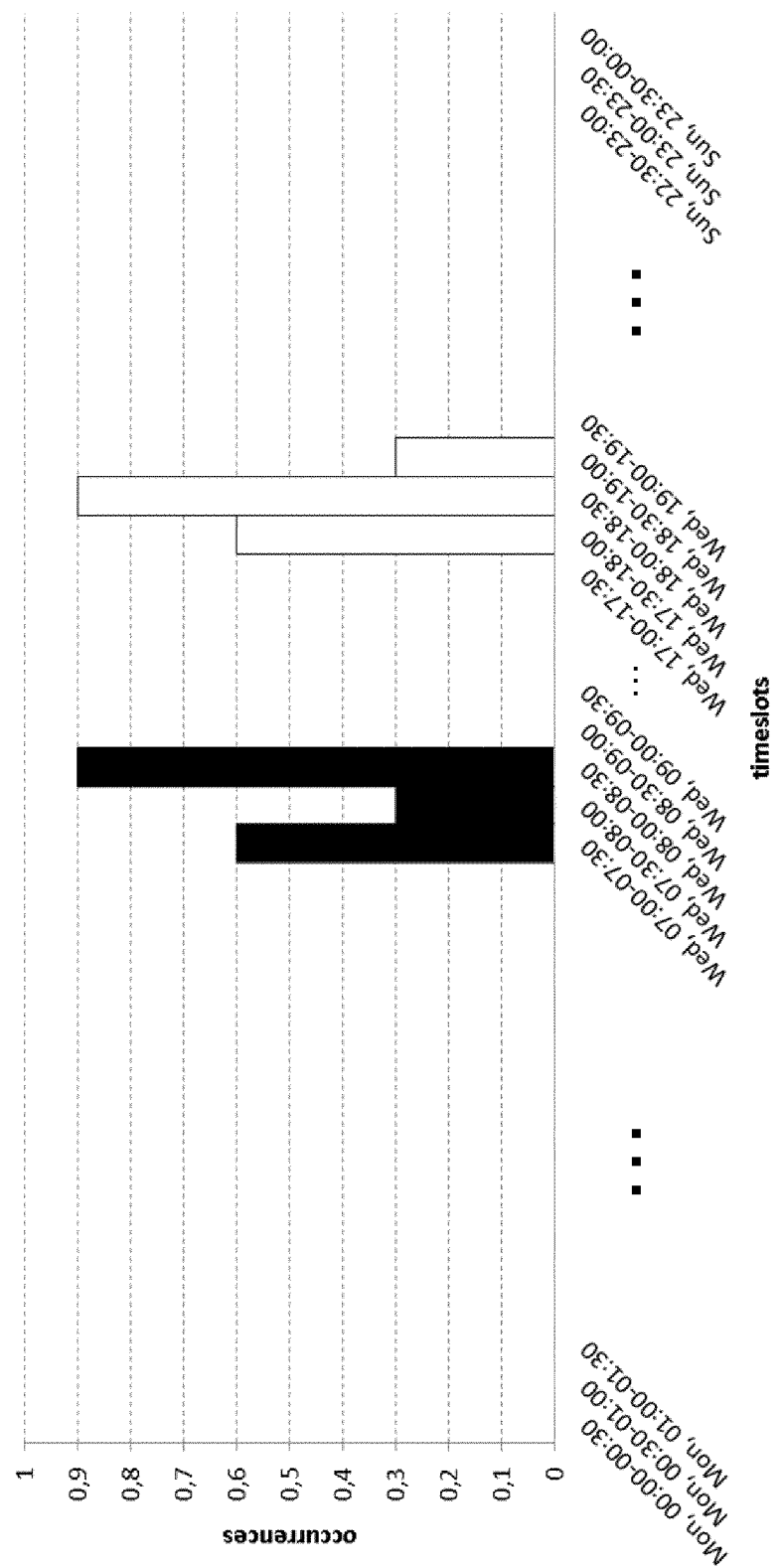
FIG. 3 is an exemplary histogram representing discretized occupancy-related events for a user.

FIG. 3 shows, by way of example, the proportion of occurrences p(w|d) of various "words" in the home occupancy weekly routine of a user $U_i$ for N=4 observation weeks, in the form of a histogram. Each bin of the histogram corresponds to a timeslot, having a corresponding label indicating the day of the week, the timeslot start time and the timeslot end time. For simplicity, only few bins are shown in FIG. 3, namely the first 3 bins of the week, the last 3 bins of the week and 10 intermediate bins (5 contiguous bins for Wednesday morning and 5 contiguous bins for Wednesday evening). In each bin, the proportion of occurrences p(w|d) of the occupancy-related events occurring in the corresponding timeslot is stored. In particular, the proportions of occurrences p(w|d) of the event "entering home $H_i$" in the various timeslots are represented as white columns, while the proportions of occurrences p(w|d) of the event "exiting home $H_i$" are represented as black columns. The histogram for instance shows that, during the 4 observation weeks, on Wednesday morning the user $U_i$ exited home $H_i$ mainly in the timeslot 08:00-08:30 and on Wednesday evening he mainly entered back home $H_i$ in the timeslot 18:00-18.30.

It may be appreciated that the histogram related to each single user $U_i$ is very sparse, namely most of the bins contain the value "0". As mentioned above, in order to provide statistical significance to such sparse data, according to embodiments of the present invention the data relating to the various users $U_i$ (i=1, 2, . . . M) are merged, as it will be described in detail herein after.

Then, after the discretization step 201, a smoothing kernel is preferably applied to the proportions of occurrences p(w|d) of the various "words" in the home occupancy weekly routine of each user $U_i$ (step 202).

Indeed, topic models assume the exchangeability of the words, namely they assume that the words in a document may be permutated since the order in which the words appear in a document is not relevant to the determination of the document topic(s) (known as the "bag-of-words" assumption). In the present case, however, exchangeability of the "words" is not a correct assumption, since there is a degree of correlation between events occurring in timeslots that are close in time. The closer the timeslots, the stronger the correlation. In order to make a topic model applicable to the present context, wherein "words" are not interchangeable, a smoothing kernel is preferably applied to the "words", which smooths the original sequence of "words" over time. In particular, the smoothing kernel spreads the proportion of occurrences p(w|d) of a word (e.g. an exiting event at a certain timeslot) on the neighbouring timeslots, the contribution of the word on each neighbouring timeslot depending on the temporal distance between the word original timeslot and the neighbouring timeslot. Preferably, the contribution decreases as the temporal distance increases. According to a particularly advantageous embodiment, the smoothing kernel is a Gaussian (or squared proportional) kernel defined as:

$$K(x, x') = e^{-\frac{1}{\sigma^2}\|x-x'\|^2} \quad [1]$$

where $\|x-x'\|^2$ is the squared temporal distance between original timeslot and neighbouring timeslot and $\sigma$ is the bandwidth which determines the extension of the smoothing. In the limit case where $\sigma \to 0$, no smoothing is applied.

Since the proportions of occurrences p(w|d) of the event "entering home Hi" in the various timeslots for the user Ui may be represented as an array $A_{entry}$ of 336 elements and, similarly, the proportions of occurrences p(w|d) of the event "exiting home Hi" in the various timeslots for the user Ui may be represented as an array $A_{exit}$ of 336 elements, the application of the smoothing kernel is preferably implemented as an inner product between matrices. In particular, a 336×336 smoothing matrix K is preferably built (e.g. starting from equation [1] above, if a squared exponential smoothing is desired). The element at the $i^{th}$ row and the $j^{th}$ column of the smoothing matrix K is preferably calculated by applying the above equation [1] to the temporal distance between the $i^{th}$ timeslot and the $j^{th}$ timeslot. Then, an array $\tilde{A}_{entry}$ of smoothed proportions of occurrences p(w|d) of the event "entering home Hi" in the various timeslots for the user Ui is preferably calculated as an inner product between the array $A_{entry}$ and the matrix K and, similarly, an array $\tilde{A}_{exit}$ of smoothed proportions of occurrences p(w|d) of the event "exiting home Hi" in the various timeslots for the user Ui is preferably calculated as an inner product between the array $A_{exit}$ and the matrix K, namely:

$$\tilde{A}_{entry} = A_{entry}^{T} * K \quad [2a]$$

$$\tilde{A}_{exit} = A_{exit}^{T} * K \quad [2b]$$

Exemplary proportions of occurrences p(w|d) of the event "entering home Hi" in the various timeslots for a user Ui before and after application of a Gaussian smoothing kernel are shown in FIG. 4. Graph (a) shows a first example with a narrower bandwidth $\sigma$ equal to about 0.01, while graph (b) shows a second example with a larger bandwidth $\sigma$ equal to about 0.1. It may be appreciated that a narrower bandwidth $\sigma$ results in a higher temporal resolution, so that most of peaks in the original data are kept distinct (except the very close ones) as shown in graph (a). Conversely, a larger bandwidth $\sigma$ results in a lower temporal resolution, so that multiple peaks are merged in a single broader peak, as shown in graph (b).

Hence, by varying $\sigma$ between 0 and $\infty$, the sequential detail of the "words" is captured at different resolutions.

Therefore, the value of $\sigma$ is selected so as to obtain a sequential resolution that captures sequential trends of the home occupancy weekly routine of the user Ui, while smoothing away finer temporal details. Preferably, the smoothing reflects the amount of variance in the observed data. If it is considered that—with Gaussian smoothing—3 standard deviations from the mean account for 99.73% of the whole data, a smoothing is preferably considered in the region of 3 hours, and then the standard deviation is around 1 hour. By normalizing this value to 24×7=168 week-hours, the value of the bandwidth a is preferably equal to about 1/168, namely it has an order of magnitude of $10^{-2}$.

The Gaussian smoothing kernel is symmetric, namely the proportions of occurrences p(w|d) of an occupancy-related event occurring in a certain timeslot are equally spread over prior and subsequent timeslots. According to advantageous variants, the smoothing kernel is instead asymmetric, namely it spreads the proportions of occurrences p(w|d) of the occupancy-related events more (or even only) in the future or more in the past. This allows inferring sequences of presence-relates events that have a cause-effect relations.

Exemplary asymmetric smoothing kernels are shown in FIG. 5. These kernels are asymmetric Gaussian (or squared proportional) kernels defined as:

$$K(x, x') = e^{-\frac{1}{\sigma_1^2}\|x-x'\|^2} \quad \text{for } x - x' \leq 0; \text{ and}$$

$$K(x, x') = e^{-\frac{1}{\sigma_2^2}\|x-x'\|^2} \quad \text{for } x - x' > 0$$

In FIG. 5, graph (a) shows a first exemplary asymmetric Gaussian smoothing kernel with $\sigma_1 > \sigma_2$, which spreads the proportion of occurrences p(w|d) of an occupancy-related event occurring in a certain timeslot mainly on past timeslots. Graph (b) instead shows a second exemplary asymmetric Gaussian smoothing kernel with $\sigma_1 < \sigma_2$, which spreads the proportion of occurrences p(w|d) of an occupancy-related event occurring in a certain timeslot mainly on subsequent timeslots. The choice of whether using a smoothing kernel as shown in graph (a) or (b) depends on both the type of occupancy-related event (entering home or exiting home) and on the main goal of the control of the cooling/heating system, which may be either the minimization of the energy wastes or the maximization of the user comfort.

In particular, if the main goal is minimizing energy waste:
  for smoothing the proportion of occurrences p(w|d) of "user Ui entering his home" events, an asymmetric smoothing kernel of the type shown in graph (b) is preferably used. This way, a higher statistical relevance is provided to subsequent timeslots, so that it is more likely that the user Ui actually enters home Hi before the foreseen time, rather than after the foreseen time. The heating/cooling system Si is accordingly more likely operated to switch on later than the user's return home Hi, so that energy waste is minimized; and
  for smoothing the proportion of occurrences p(w|d) of "user Ui exiting home" events, an asymmetric smoothing kernel of the type shown in graph (a) is preferably used. This way, a higher statistical relevance is provided to past timeslots, so that it is more likely that the user Ui actually exits home Hi after the foreseen time, rather than before the foreseen time. The heating/cooling system Si is accordingly more likely operated to switch off in advance with respect to the user's exit home Hi, so that energy waste is minimized.

Conversely, if the main goal is maximizing the user's comfort:

for smoothing the proportion of occurrences p(w|d) of "user Ui entering home" events, an asymmetric smoothing kernel of the type shown in graph (a) is preferably used. This way, a higher statistical relevance is provided to past timeslots, so that it is more likely that the user Ui actually enters home Hi after the foreseen time, rather than before the foreseen time. The heating/cooling system Si is accordingly more likely operated to switch on in advance with respect to the user's return to home Hi, so that the user's comfort is maximized; and for smoothing the proportion of occurrences p(w|d) of "user Ui exiting home" events, an asymmetric smoothing kernel of the type shown in graph (b) is preferably used. This way, a higher statistical relevance is provided to subsequent timeslots, so that it is more likely that the user Ui actually exits home Hi before the foreseen time, rather than after the foreseen time. The heating/cooling system Si is accordingly more likely operated to switch off late with respect to the user's exit from home Hi, so that the user's comfort is maximized.

In order to choose whether to apply a symmetric kernel or an asymmetric kernel of the type shown in graph (a) or (b) of FIG. 5 to the arrays $A_{entry}$ and $A_{exit}$ of the user Ui, the algorithm may ask the user Ui whether he wishes to particularly optimize the energy saving or the user's comfort. Alternatively, the algorithm may automatically determine the smoothing kernel to be applied without asking the user's preferences.

Figure 2:
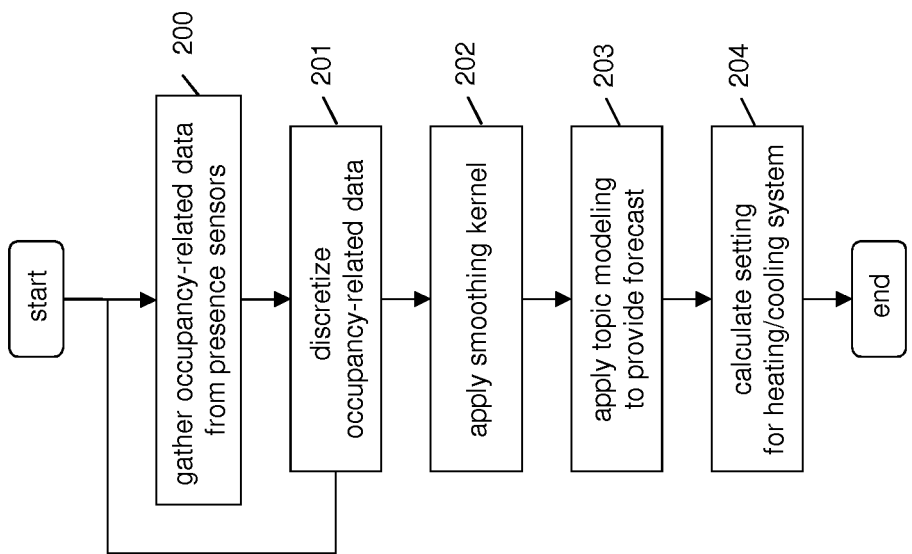
FIG. 2 is a flow chart of the method according to embodiments of the present invention.

By referring again to the flow chart of FIG. 2, upon completion of the smoothing step 202, a topic model is preferably applied to the smoothed proportions of occurrences of the occupancy-related events in the home occupancy routines of all the users Ui (i=1, 2, . . . M) (step 203).

To this purpose, the smoothed proportions of occurrences of the occupancy-related events in the home occupancy routines of all the users Ui (i=1, 2, . . . M) are firstly merged. In particular, since each user Ui has associated a respective array $\tilde{A}_{entry}$ of smoothed proportions of occurrences p(w|d) of the event "entering home Hi" in the various timeslots, the arrays $\tilde{A}_{entry}$ of all the users Ui (i=1, 2, . . . M) are merged in a single matrix $M_{entry}$ of 336 rows by M columns, each column being the array $\tilde{A}_{entry}$ of a user Ui. Similarly, since each user Ui has associated a respective array $\tilde{A}_{exit}$ of smoothed proportions of occurrences p(w|d) of the event "exiting home Hi" in the various timeslots, the arrays $\tilde{A}_{exit}$ of all the users Ui (i=1, 2, . . . M) are merged in a single matrix $M_{exit}$ of 336 rows by M columns, each column being the array $\tilde{A}_{exit}$ of a user Ui.

The matrices $M_{entry}$, $M_{exit}$ therefore basically represent two corpora of documents, to which a Bayesian topic model is applied. In particular, according to a preferred embodiment, a known LDA (Latent Dirichlet Allocation) algorithm is applied in a known way to each one of the matrices $M_{entry}$, $M_{exit}$ in order to determine:

a first matrix $\varphi_{entry}$, $\varphi_{exit}$, each column of the first matrix $\varphi_{entry}$, $\varphi_{exit}$ indicating the probabilities p(w|t) that a certain habit (topic) generates a certain time sequence of occupancy-related events (entry or exit) in the various timeslots; and a second matrix $\theta_{entry}$, $\theta_{exit}$, each column of the second matrix $\theta_{entry}$, $\theta_{exit}$ indicating the proportions p(t|d) of the various habits (topics) in the home occupancy weekly routine of each user Ui.

The home occupancy weekly routine of at least one the users Ui is finally preferably forecast based on the matrixes $\varphi_{entry}$, $\varphi_{exit}$ and matrixes $\theta_{entry}$, $\theta_{exit}$. The matrixes $\varphi_{entry}$, $\varphi_{exit}$ and $\theta_{entry}$, $\theta_{exit}$ are indeed a generative model of the user's behaviour. The behaviour of each user Ui may be accordingly forecast by suitably instantiating this model. In particular, the probabilities that the various users Ui enter or exit their respective homes Hi in the various timeslots of the week are preferably provided in the form of forecast matrixes $F_{entry}$, $F_{exit}$, which are calculated as internal products between the first matrixes $\varphi_{entry}$, $\varphi_{exit}$ and the second matrixes $\theta_{entry}$, $\theta_{exit}$, namely:

$$F_{entry} = \varphi_{entry} * \theta_{entry} \qquad [3a]$$

$$F_{exit} = \varphi_{exit} * \theta_{exit} \qquad [3b]$$

The $i^{th}$ column of the forecast matrix $F_{entry}$ indicates the probabilities that the user Ui enters home Hi at the various timeslots, whereas the $i^{th}$ column of the forecast matrix $F_{exit}$ indicates the probabilities that the user Ui exits home Hi at the various timeslots. Hence, for each user Ui, a forecast of his home occupancy weekly routine is preferably provided, for instance in terms of times at which the user will most probably exit home (corresponding to the timeslots having the highest probability values in the $i^{th}$ column of the forecast matrix $F_{exit}$) and times at which he will most probably enter home (corresponding to the timeslots having the highest probability values in the $i^{th}$ column of the forecast matrix $F_{entry}$) during the various days of the week.

It may be appreciated that this forecast of the home occupancy weekly routine of each single user Ui is much more reliable than that which would have been inferred from data relating to the single user alone. Data relating to a single user are indeed sparse and therefore could hardly provide a reliable forecast of the user's home occupancy habits. The merging of data relating to several users and the application of a topic model instead provides a reliable forecast, because it allows identifying a set of habits (the topics) which are behind the occupancy-related events of the various users and which are shared by the various users, who share such habits in different proportions. The quantification of such proportions for each user allows making more precise and reliable forecasts of the user's home occupancy habits.

Then, based on the forecast of the home occupancy weekly routine for each user Ui, a suitable setting of the heating/cooling system Si located in his home Hi is preferably calculated (step 204). The setting of each heating/cooling system Si is preferably provided in terms of switch-on time, switch-off time of the heating/cooling system during the various days of the week. Alternatively, the setting of each heating/cooling system Si is preferably provided in terms of temperature during each timeslot of the week.

Since the forecast of the user's home occupancy habits is reliable, the settings calculated at step 204 likely closely fit the actual user's behaviour, so that minimization of the energy wastes and/or maximization of the user comfort may be advantageously achieved. Use of an asymmetric kernel as described above may further increase the efficiency with which either the energy wastes are minimized or the user's comfort is maximized.

If the control unit TVi of the heating/cooling system Si may be automatically set via the access gateway AGi, the setting determined at step 204 may be automatically converted in suitable control signals, which are transmitted to the control unit TVi via the communication network CN and the access gateway AGi. This way, the control unit TVi is automatically set as determined by the algorithm at step 204.

Alternatively, the setting determined at step 204 may be sent to the user Ui (e.g. via SMS) in the form of suggestions for manually setting the control unit TVi in an optimal way.

Preferably, steps 202-204 are periodically iterated, so as to keep the forecast of the home occupancy weekly routine of each user updated. In particular, at each iteration of steps 202-204, the histograms relating to each user are "cleaned" by removing the older occurrences of each occupancy-related event, so that steps 202-204 are always carried out on occupancy-related events occurring in the last N weeks. This allows calculating the forecast of the home occupancy weekly routine of each user and the setting of his heating/cooling system on the most recent occupancy-related events only. Preferably, steps 202-204 are carried out every day, so as to daily update the forecast of the home occupancy weekly routine of each user Ui and the setting of his heating/cooling system. Though the above description has been made with reference to the home of a user as a whole, according to other embodiments the described method may be applied to one or more specific rooms of the home. For instance, the monitored occupancy-related events may relate to one or more of kitchen, bedroom, bathroom or other rooms of the home. In such case, a presence sensor shall be provided in each room to be monitored, which provides occupancy-related data from which occupancy-related events such as "entering the room" and "exiting the room" may be inferred. The occurrences of these events in the room occupancy weekly routine of each user are counted, and then the counts of occurrences of events relating to a same kind of room in different homes are merged as described above. Then, a Bayesian topic model (such as LDA) is applied to the merged counts, so as to identify the habits hidden in the occupancy weekly routine for that room of the various users. Reliable forecasts may be accordingly made of the occupancy habits of that room for each single user, and then optimum settings may be calculated for the heating/cooling unit located in that room.

Hence, the method for controlling a heating/cooling equipment according to embodiments of the present invention takes advantage of the combined use of data indicative of the home (or room) occupancy habits of several users, which enhances its capability of reliably predicting the home (or room) occupancy habits of every single user, even if the data for each single user are sparse. The heating/cooling system of each user may be accordingly set so as to fit more precisely the actual home occupancy habits of each user (also of a new user), thereby allowing to minimize energy wastes and/or to maximize the user's comfort.

The invention claimed is:

1. A method for controlling a heating/cooling system located in a domestic environment of a user, the method comprising:
   a) for each user of a number M of users including the user, detecting occurrences of an occupancy-related event carried out by the each user in its respective domestic environment, the occupancy-related event being indicative of a change of status of the domestic environment between an occupied status and a non-occupied status;
   b) for the each user, providing respective counts of occurrences of the occupancy-related event in a plurality of timeslots;
   c) merging the respective counts of occurrences of the occupancy-related event in the plurality of timeslots relating to the number M of users and applying a model thereto, to provide a forecast of a domestic environment occupancy routine of the user; and
   d) based on the forecast of the domestic environment occupancy routine of the user, determining a setting of the heating/cooling system located in the domestic environment of the user,
   wherein at b) the providing respective counts for each user comprises dividing a week into the plurality of timeslots having a same duration T and, during a number N of observation weeks, counting for each timeslot a respective number of the occurrences of the occupancy-related event in the each timeslot,
   at b) the number of occurrences of the occupancy-related event in the each timeslot counted during the N observation weeks are weighted, and
   at b) each occurrence of the number of occurrences of the occupancy-related event in the each timeslot counted during the N observation weeks is multiplied by a respective weight $\alpha^n$, wherein $\alpha$ is in a range and n is an observation week index ranging from 1 to N.

2. The method according to claim 1, wherein at a) the detecting comprises receiving information from at least one presence sensor located in the respective domestic environment of the each user and processing the information to determine whether the occupancy-related event occurred, the occupancy-related event comprising one of the each user entered the respective domestic environment or the each user exited the respective domestic environment.

3. The method according to claim 2, wherein the at least one sensor is a carbon dioxide ($CO_2$) sensor.

4. The method according to claim 1, wherein at b) the smoothing kernel distributes the proportion of occurrences of the occupancy-related event in the certain timeslot over the at least one timeslot preceding the certain timeslot, or over the at least one timeslot following the certain timeslot.

5. The method according to claim 1, wherein at c) the merging comprises merging the smoothed proportions of occurrences of the occupancy-related event in the plurality of timeslots calculated for the number M of users in a matrix, each column of the matrix comprising the smoothed proportions of occurrences of the occupancy-related event in the plurality of timeslots calculated for the each user.

6. The method according to claim 5, wherein at c) the applying the model comprises processing the matrix to determine:
   (i) a first matrix, each column of the first matrix comprising probabilities that a certain habit generates a certain time sequence of occupancy-related events in the plurality of timeslots; and
   (ii) a second matrix, each column of the second matrix indicating proportions of a plurality of habits in the domestic environment occupancy routine of the each user.

7. The method according to claim 6, wherein at c) the forecast of the domestic environment occupancy routine of the user is calculated as an internal product between the first matrix and the second matrix, the internal product resulting in a forecast matrix, a column of the forecast matrix comprising probabilities that the occupancy-related event occurs in the plurality of timeslots for the user.

8. The method according to claim 7, wherein c) comprises providing the forecast of the domestic environment occupancy routine of the user in terms of times at which the occupancy-related event will most probably occur, the times corresponding to timeslots of the plurality of timeslots having higher probability values in the column of the forecast matrix.

9. The method according to claim 8, wherein at d) the determining the setting of the heating/cooling system comprises determining at least one switch-on time and/or at least one switch-off time of the heating/cooling system based on the times at which the occupancy-related event will most probably occur according to the forecast of the domestic environment occupancy routine of the user.

10. The method according to claim 1, wherein d) further comprises providing at least one control signal configured to operate the heating/cooling system according to the determined setting.

11. The method according to claim 1, wherein b), c) and d) are periodically iterated.

12. A non-transitory computer readable medium including a computer program product loadable in the memory of at least one computer and including software code portions for performing the method of claim 1, when the product is run on at least one computer.

13. A device for controlling a heating/cooling system located in a domestic environment of a user, the device comprising:

processing circuitry configured to:

a) for each user of a number M of users including the user, detect occurrences of an occupancy-related event carried out by the each user in its respective domestic environment, the occupancy-related event being indicative of a change of status of the domestic environment between an occupied status and a non-occupied status;

b) for the each user, provide respective counts of occurrences of the occupancy-related event in a plurality of timeslots;

c) merge the respective counts of occurrences of the occupancy-related event in the plurality of timeslots relating to the number M of users and apply a model thereto, to provide a forecast of a domestic environment occupancy routine of the user; and d) based on the forecast of the domestic environment occupancy routine of the user, determine a setting of the heating/cooling system located in the domestic environment of the user, wherein at b) to provide the respective counts for each user the processing circuitry divides a week into the plurality of timeslots having a same duration T and, during a number N of observation weeks, counts for each timeslot a respective number of the occurrences of the occupancy-related event in the each timeslot, at b) the number of occurrences of the occupancy-related event in the each timeslot counted during the N observation weeks are weighted, and at b) each occurrence of the number of occurrences of the occupancy-related event in the each timeslot counted during the N observation weeks is multiplied by a respective weight $\alpha^n$, wherein $\alpha$ is in a range and n is an observation week index ranging from 1 to N.

* * * * *